(12) United States Patent
Nakane

(10) Patent No.: US 10,593,030 B2
(45) Date of Patent: Mar. 17, 2020

(54) IMAGE FORMING APPARATUS CAPABLE OF CHANGING THICKNESS OF CHARACTER, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Hiroyuki Nakane, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/442,646

(22) Filed: Jun. 17, 2019

(65) Prior Publication Data

US 2019/0392566 A1 Dec. 26, 2019

(30) Foreign Application Priority Data

Jun. 20, 2018 (JP) .................................. 2018-117096

(51) Int. Cl.
*G06T 5/50* (2006.01)
*G06T 3/20* (2006.01)
(Continued)

(52) U.S. Cl.
CPC ............... *G06T 5/50* (2013.01); *G06T 3/20* (2013.01); *G06T 11/60* (2013.01); *G06T 1/0007* (2013.01)

(58) Field of Classification Search
CPC ... G06T 5/50; G06T 3/20; G06T 11/60; G06T 1/0007
See application file for complete search history.

(56) References Cited

U.S. PATENT DOCUMENTS 5,526,476 A 6/1996 Motokado
6,744,533 B1 * 6/2004 Easwar .................. G06K 15/02
345/563

(Continued)

FOREIGN PATENT DOCUMENTS

JP H08137460 A 5/1996
JP H09198499 A 7/1997
JP 2012121265 A 6/2012

OTHER PUBLICATIONS

Extended European Search Report issued in European Appln. No. 19180785.8 dated Oct. 15, 2019.

*Primary Examiner* — Quang N Vo
(74) *Attorney, Agent, or Firm* — Rossi, Kimms & McDowell LLP

(57) ABSTRACT

An image forming apparatus that is capable of adjusting thickness of a graphic character. An image forming apparatus including at least one controller, having one or more processors that execute instructions stored in at least one memory and/or one or more circuitries, being configured to generate an graphic object from a drawing command set for printing the graphic object included in a print job, generate a first mask image by rendering the graphic object, generate a second mask image by shifting the first mask image in a thickening direction by the number of pixels of a thickening width, generate a third mask image by logically composing the first mask image and the second mask image, convert the third mask image into intermediate data, and generate raster image by rendering of the intermediate data.

13 Claims, 19 Drawing Sheets

(51) Int. Cl.
*G06T 11/60* (2006.01)
*G06T 1/00* (2006.01)

(56) References Cited

U.S. PATENT DOCUMENTS

2007/0008320 A1 1/2007 Watanabe
2011/0007361 A1 1/2011 Takahashi
2011/0115796 A1* 5/2011 Murrett .................. G06T 11/60
 345/467
2017/0053194 A1 2/2017 Ooyanagi

* cited by examiner

FIG. 7A

< IMAGE A >

EXPAND IMAGE AREA IN x DIRECTION BY 1 PIXEL →

↓ EXPAND IMAGE AREA IN y DIRECTION BY 1 PIXEL

FIG. 7B

< IMAGE B SHIFTED IN x DIRECTION BY 1 PIXEL >

FIG. 7C

< IMAGE C SHIFTED IN y DIRECTION BY 1 PIXEL >

< IMAGE D SHIFTED IN xy DIRECTION BY 1 PIXEL >

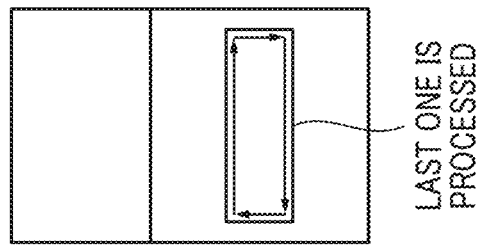
FIG. 10D  LAST ONE IS PROCESSED
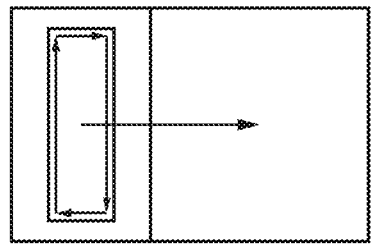
FIG. 10C
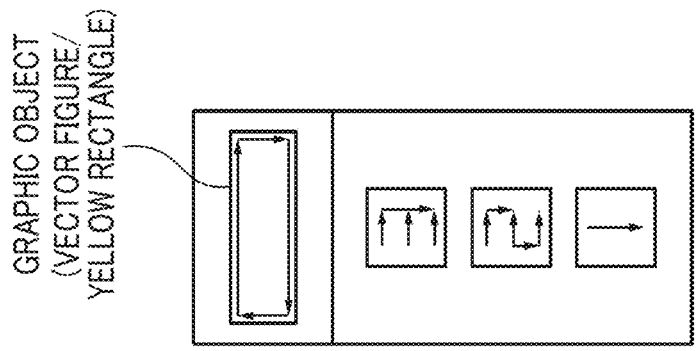
FIG. 10B  GRAPHIC OBJECT (VECTOR FIGURE/ YELLOW RECTANGLE)
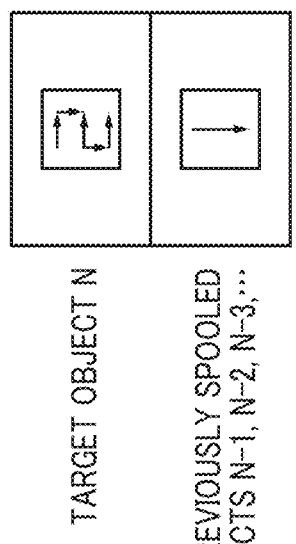
FIG. 10A  TARGET OBJECT N  PREVIOUSLY SPOOLED OBJECTS N-1, N-2, N-3,···

IMAGE FORMING APPARATUS CAPABLE OF CHANGING THICKNESS OF CHARACTER, CONTROL METHOD THEREFOR, AND STORAGE MEDIUM STORING CONTROL PROGRAM THEREFOR

BACKGROUND OF THE INVENTION

Field of the Invention

The present invention relates to an image forming apparatus, a control method therefor, and a storage medium storing a control program therefor, and in particular, relates to a technique to change thickness of characters.

Description of the Related Art

Some conventional image forming apparatuses like printers are equipped with a function that thickens characters (expands width of lines) in order to legibly emphasize the characters within an image printed on a sheet in accordance with print data.

Japanese Laid-Open Patent Publication (Kokai) No. 2012-121265 (JP 2012-121265A) discloses a technique that thickens characters by expanding a pixel of a character attribute object towards an adjacent pixel.

Moreover, the number of cases where a document editing application that runs on a client apparatus like a PC converts a character in a document into a graphic object and transfers it to a printer driver has increased.

When usability is taken into consideration, it is preferable to apply a thickening process even to the character that has been converted into the graphic object (hereinafter referred to as a "graphic character") as mentioned above. Although a character attribute object is stored in print data as bit map information, a graphic object is stored in print data as vector information. Accordingly, the character thickening process applied to the character attribute object disclosed in the above-mentioned publication cannot be simply diverted to a graphic character.

SUMMARY OF THE INVENTION

The present invention provides an image forming apparatus that is capable of adjusting thickness of a graphic character, a control method therefor, and a storage medium storing a control program therefor.

Accordingly, a first aspect of the present invention provides an image forming apparatus including at least one controller, having one or more processors that execute instructions stored in at least one memory and/or one or more circuitries, being configured to generate an graphic object from a drawing command set for printing the graphic object included in a print job, generate a first mask image by rendering the graphic object, generate a second mask image by shifting the first mask image in a thickening direction by the number of pixels of a thickening width, generate a third mask image by logically composing the first mask image and the second mask image, convert the third mask image into intermediate data, and generate raster image by rendering of the intermediate data.

Accordingly, a second aspect of the present invention provides a control method for an image processing apparatus, the control method including generate an graphic object from a drawing command set for printing the graphic object included in a print job, generate a first mask image by rendering the graphic object, generate a second mask image by shifting the first mask image in a thickening direction by the number of pixels of a thickening width, generate a third mask image by logically composing the first mask image and the second mask image, convert the third mask image into intermediate data, and generate raster image by rendering of the intermediate data.

Accordingly, a third aspect of the present invention provides a non-transitory computer-readable storage medium storing a control program causing a computer to execute the control method of the second aspect.

According to the present invention, thickness of a graphics character is able to be adjusted.

Further features of the present invention will become apparent from the following description of exemplary embodiments with reference to the attached drawings.

BRIEF DESCRIPTION OF THE DRAWINGS

FIG. 7A through FIG. 7E are views showing stages of the thickened image generating process in FIG. 5.

FIG. 10A through FIG. 10D are views for describing a method for spooling an object in the image forming process in FIG. 9.

DESCRIPTION OF THE EMBODIMENTS

Figure 1:
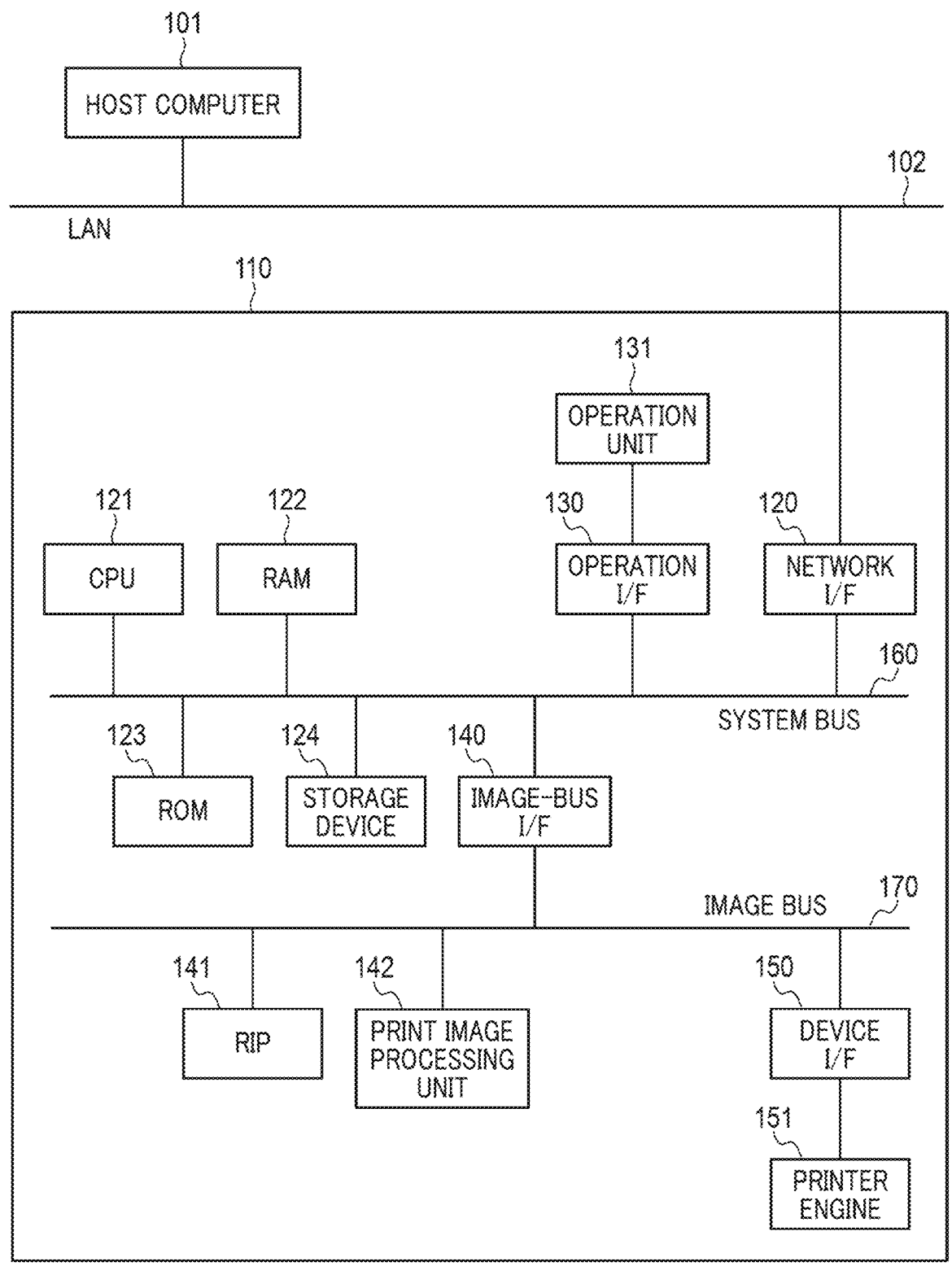
FIG. 1 is a block diagram schematically showing a configuration a system including an image forming apparatus according to a first embodiment of the present invention.

Hereafter, embodiments according to the present invention will be described in detail by referring to the drawings.

FIG. 1 is a block diagram schematically showing a configuration of a system including an image forming apparatus 110 according to the first embodiment of the present invention. In this system, the image forming apparatus 110 connects with a host computer 101 through a LAN 102.

First, a user generates PDL data showing pages of a print target as a print job on the host computer 101 and transfers it to the image forming apparatus 110. The image forming apparatus 110 performs a print process on the basis of the transferred PDL data. The image forming apparatus 110 is an MFP (Multi-Function Peripheral), an SFP (Single Function Peripheral), or another printer.

A detailed hardware configuration of the image forming apparatus 110 will be described by referring to FIG. 1. As shown in FIG. 1, the image forming apparatus 110 has a printer engine 151 that is an image output device. Moreover, the image forming apparatus 110 controls input and output of PDL data and device information through the LAN 102 by connecting with the LAN 102.

A CPU 121 is a central processing unit for controlling the whole image forming apparatus 110. The CPU 121 is an example of a processor that repeats a cycle of fetching a calculation instruction in a program of software 200, which will be described referring to FIG. 2, from a RAM 122, decoding, and executing.

The RAM 122 is a system work memory for operating the CPU 121. Moreover, the RAM 122 temporarily stores intermediate data generated in the image forming apparatus 110 for the print process of PDL data transferred through the LAN 102 and input image data, and functions as a work area for a rendering process.

Furthermore, a ROM 123 is a boot ROM and stores a boot program of the image forming apparatus 110. A storage unit 124 is a hard disk drive that stores software for various processes and stores transferred PDL data.

An operation I/F 130 is an interface between a system bus 160 and an operation unit 131 that has a display screen that is able to display various menus, print data information, etc. The operation I/F 130 transfers operation screen data to the operation unit 131. Moreover, the operation I/F 130 transfers information entered by a user through the operation unit 131 to the CPU 121. For example, the user instructs printing of PDL data stored in the storage unit 124 through the operation unit 131. Moreover, the user may instruct change of thickness according to user's preference, which will be described in the first embodiment, through the operation unit 131.

A network I/F 120 is connected to the LAN 120, and inputs and outputs information with an external apparatus. The above-mentioned units are arranged on the system bus 160. An image bus I/F 140 is an interface for connecting the system bus 160 to an image bus 170 that transfer image data at high speed, and is a bus bridge that converts a data structure.

An RIP (Raster Image Processor) 141, a print image processing unit 142, and a device I/F 150 are connected to the image bus 170. The RIP 141 generates a raster image of a page in an RGB format from the generated intermediate data. The print image processing unit 142 converts the raster image of the page in the RGB format that the RIP 141 generates into a raster image of a page in a CMYK format and applies a screening process to the raster image in the CMYK format. A device I/F 150 connects the printer engine 151 and the image forming apparatus 110, converts the raster image after the screening process into a format that the printer engine 151 is processable, and transfers the converted image data to the printer engine 151. The printer engine 151 prints an image in accordance with the image data transferred from the device IT 150.

Figure 2:
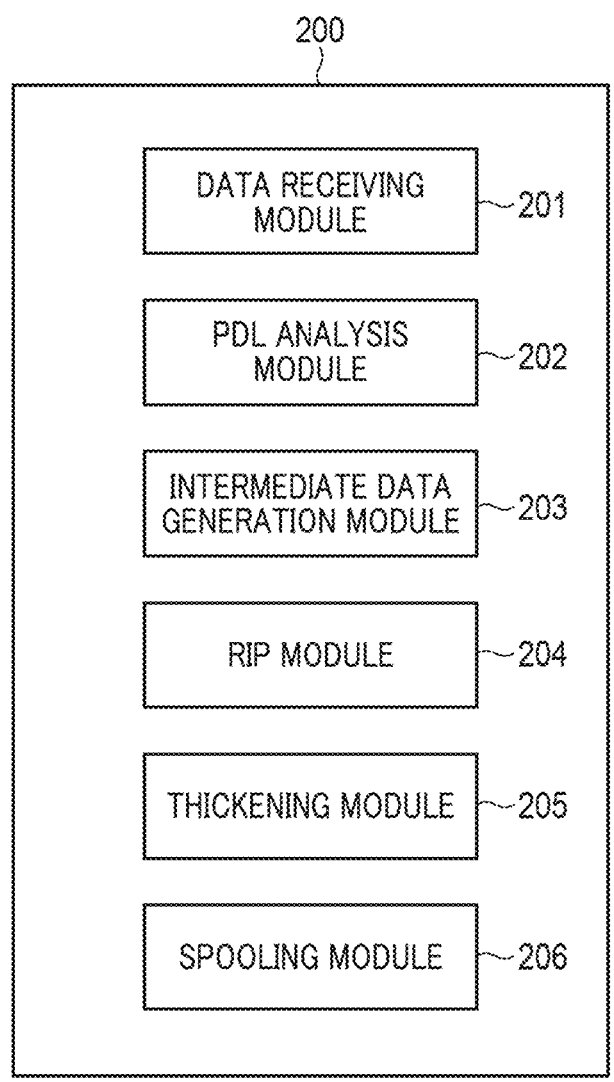
FIG. 2 is a block diagram schematically showing a software configuration of the image forming apparatus.

FIG. 2 is a block diagram schematically showing a configuration of the software 200 of the image forming apparatus 110.

The software 200 of the image forming apparatus 110 consists of six software modules, and these all run on the CPU 121.

A data receiving module 201 receives PDL data from the network I/F 120. The PDL data received is stored in the RAM 122. A PDL analysis module 202 reads and interprets a drawing command set designated by the PDL data stored in the RAM 122. Furthermore, the PDL analysis module 202 decides shape and color information about an object that is a drawing target according to the drawing command set, and generates the object.

A thickening module 205 applies a thickening process to the object generated by the PDL analysis module 202. An intermediate data generation module 203 generates a DL (Display List) that is intermediate data from the object after the thickening process. The intermediate data generation module 203 holds the generated DL in a DL memory area of the RAM 122 until the above-mentioned predetermined process has been applied to all the objects generated by the PDL analysis module 202.

An RIP module (Raster Image Processing Module) 204 rasterizes the objects on the basis of the DL generated by the intermediate data generation module 203.

The thickening module 205 determines whether an object generated by PDL analysis module 202 is targeted to the thickening process. Then the thickening module 205 applies the thickening process by pixels instructed by the user through the operation unit 131 to the targeted object. Although the user instructs settings about the thickening process through the operation unit 131 in the first embodiment, the present invention is not limited to such a configuration. For example, a printer driver of the host computer 101 may add an instruction about print setting information, or such an instruction may be described in the DL command at the time of generating the PDL data.

When the thickening module 205 applies the thickening process to a plurality of objects all at once, a spooling module 206 temporarily spools the objects targeted to the thickening process in a spool area of the RAM 122.

Figure 11:
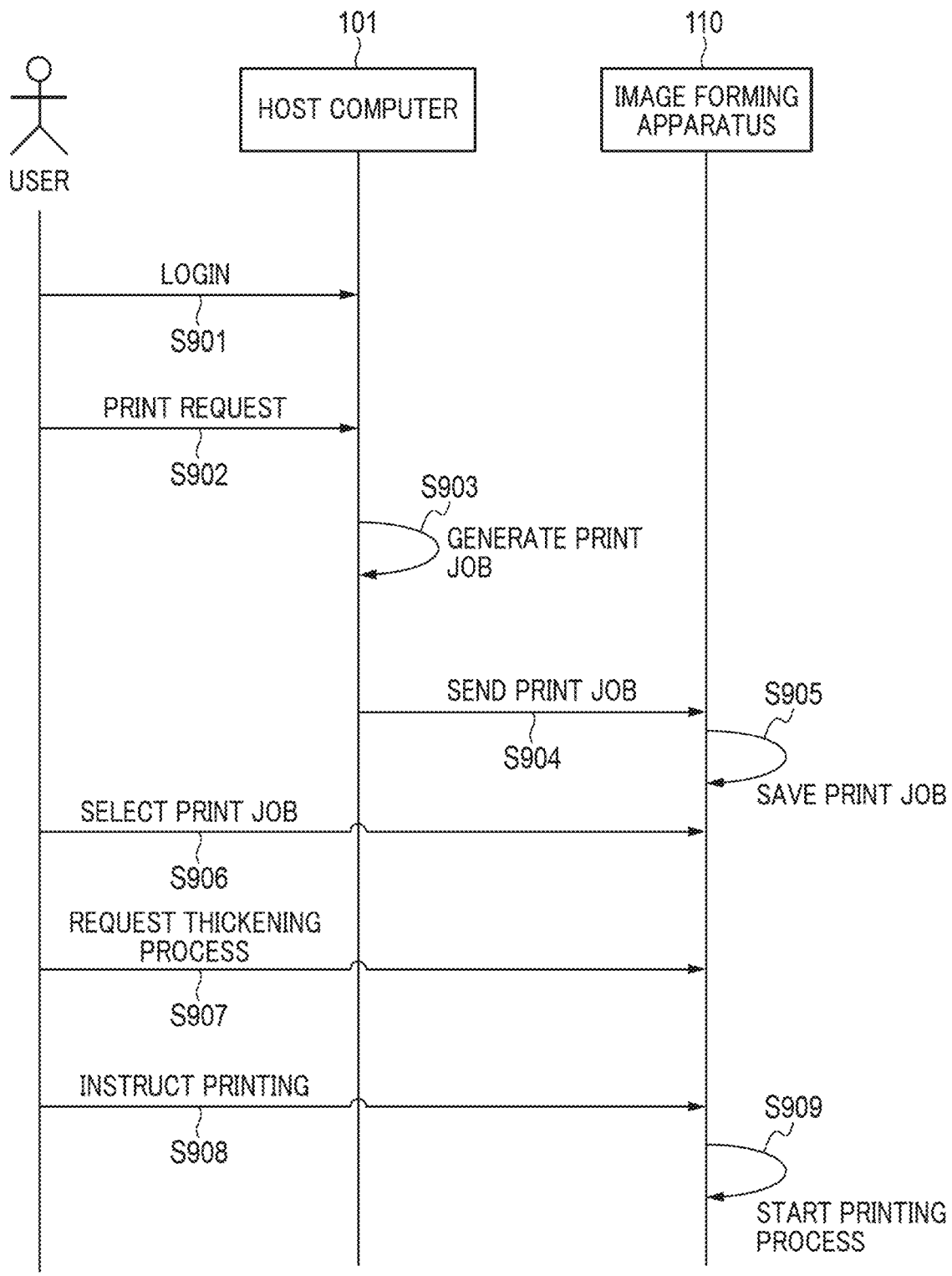
FIG. 11 is a sequence chart schematically showing processes in a host computer and the image forming apparatus when a print process is performed in the system in FIG. 1.

FIG. 11 is a sequence chart schematically showing processes in the host computer 101 and the image forming apparatus 110 when a print process is performed in the system in FIG. 1.

After a user logs in to the host computer 101 (step S901), when a user's request of printing data from an arbitrary application occurs (step S902), the host computer 101 generates PDL data (a print job) through the printer driver (step S903). Although the user requests the thickening process through the operation unit 131 of the image forming apparatus 110 in step S907 mentioned later in the first embodiment, the present invention is not limited to such a configuration. For example, the printer driver may set the setting about the thickening process as a part of the print setting information or the PDL command in the step S903. Then, the host computer 101 sends the generated PDL data to the image forming apparatus 110 (step S904).

When the data receiving module 201 receives the PDL data from the host computer 101 through the network OF 120, the image forming apparatus 110 saves the PDL data in the RAM 122 or the storage unit 124 (step S905). Although the case where the PDL data is obtained from the host computer 101 is described as an example in the first embodiment, the PDL data may be obtained from another image forming apparatus. Moreover, the PDL data may be obtained from a storage device like a flash memory that is directly inserted into a USB terminal (not shown) of the image forming apparatus 110. A source from which the PDL data is obtained is not limited.

Figure 13:
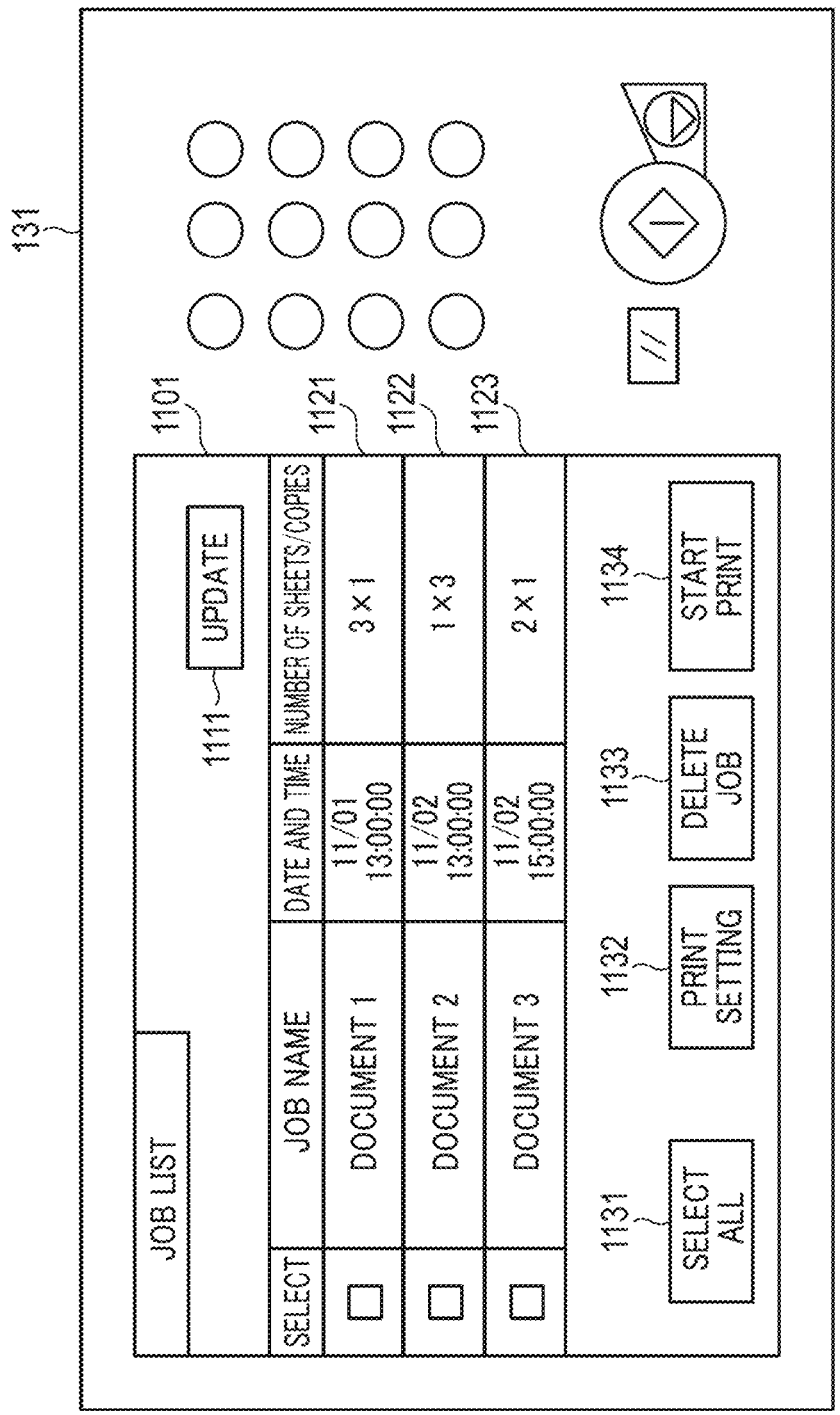
FIG. 13 is a view showing a job list screen displayed on an operation unit of the image forming apparatus in FIG. 1 in step S906 in FIG. 11.

Next, the user selects the PDL data to print using the operation unit 131 of the image forming apparatus 110 (step S906), requests the thickening process (step S907), and instructs printing (step S908). A job list screen displayed on the operation unit 131 in the step S906 is shown in FIG. 13. Moreover, a thickness adjustment screen displayed on the operation unit 131 in the step S907 is shown in FIG. 14.

As shown in FIG. 13, the display panel 1101 shows the job list screen for selecting PDL data to print. Jobs 1121, 1122, and 1123 saved in the image forming apparatus 110 are displayed in the job list screen on the operation unit 131 as the PDL data of print targets in the step S906 so as to be selectable by the user. When a job deletion button 1133 is pressed, a deletion process for the selected PDL data in the job list screen starts. When a printing start button 1134 is pressed, a printing process for the selected PDL data starts.

Moreover, when a select-all button 1131 is pressed, all the PDL data displayed in the job list screen are selected. When a print setting button 1132 is pressed, the user is able to change print settings (collective printing, staple, etc.) of the PDL data selected in the job list screen. Moreover, the request of the thickening process in the step S907 is one of the print settings that are changeable after pressing the print setting button 1132.

Figure 4A:
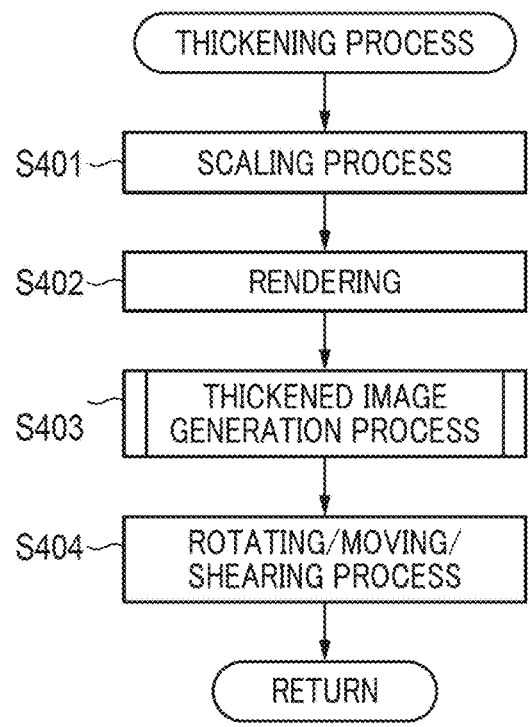
FIG. 4A is a flowchart showing procedures of a thickening process in step S306 in FIG. 3.
Figure 14:
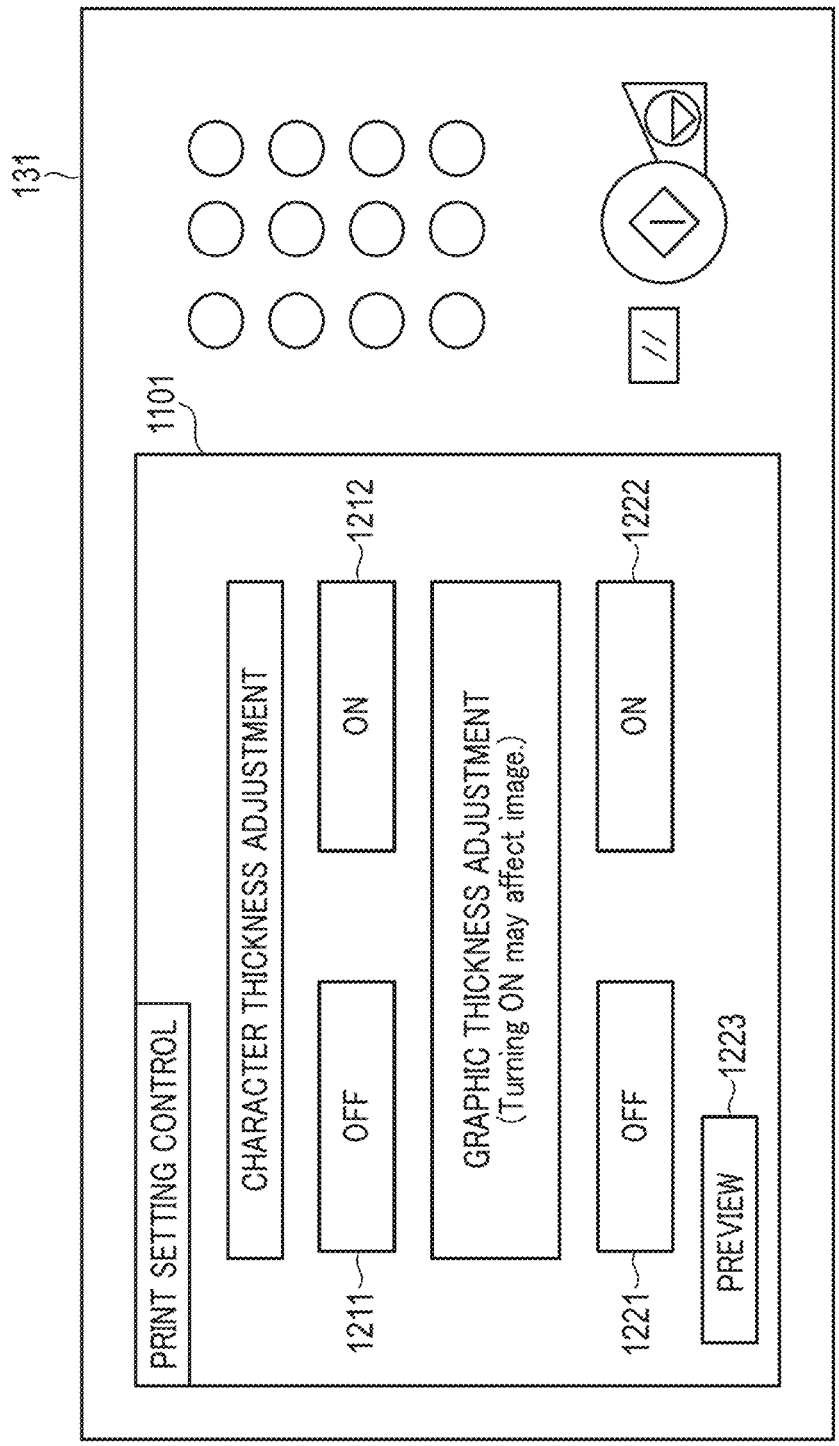
FIG. 14 is a view showing a thickness adjustment screen displayed on the operation unit in step S907 in FIG. 11.

As shown in FIG. 14, the display panel 1101 shows the thickness adjustment screen in which OFF/ON of thickness adjustment functions for characters and graphics are switched. The thickening process that will be mentioned later by referring to FIG. 4A is applied to the PDL data that the user selected as the print target in the step S906 when the user selects an ON button 1222 for graphic thickness adjustment in the thickness adjustment screen. The operation unit 131 notifies the CPU 121 of the setting value showing this user's selection through the operation unit I/F 130. The CPU 121 stores the setting value in the RAM 122. In addition, when the user selects the ON button 1222, an image may be affected as described by referring to FIG. 8A through FIG. 8C. Accordingly, when the user selects a preview button 1223 after selecting the ON button 1222, a preview of the image obtained by applying the thickening process in FIG. 4A in the first embodiment is displayed on the display panel 1101. A process performed when the user selects not only the ON button 1222 for the graphic thickness adjustment but also an ON button 1212 for character thickness adjustment in the thickness adjustment screen will be described in detail in a third embodiment.

Furthermore, a slide bar for the character thickness adjustment and a slide bar for the graphic thickness adjustment may be displayed in the display panel 1101 so that the user can adjust thickening widths of characters and graphics by changing the positions of the slide bars.

Figure 3:
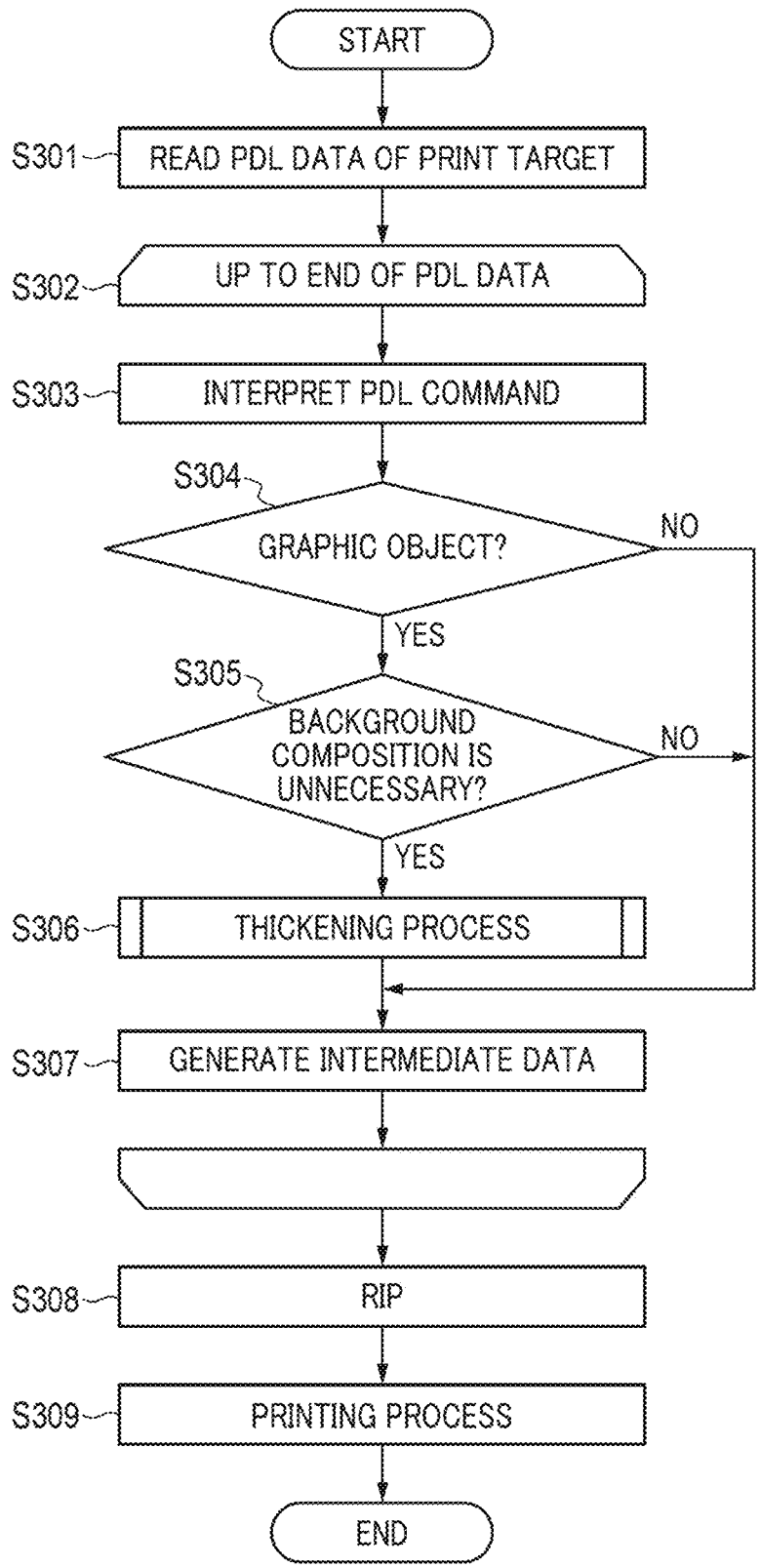
FIG. 3 is a flowchart showing procedures of an image forming process according to the first embodiment.

Referring back to FIG. 11, when receiving the print instruction in the step S908, the image forming apparatus 110 starts a printing process (step S909). In this case, the image forming process that will be described later by referring to FIG. 3 is performed first, and the thickening process to the graphic object included in the PDL data selected in the step S906 is performed.

Figure 12:
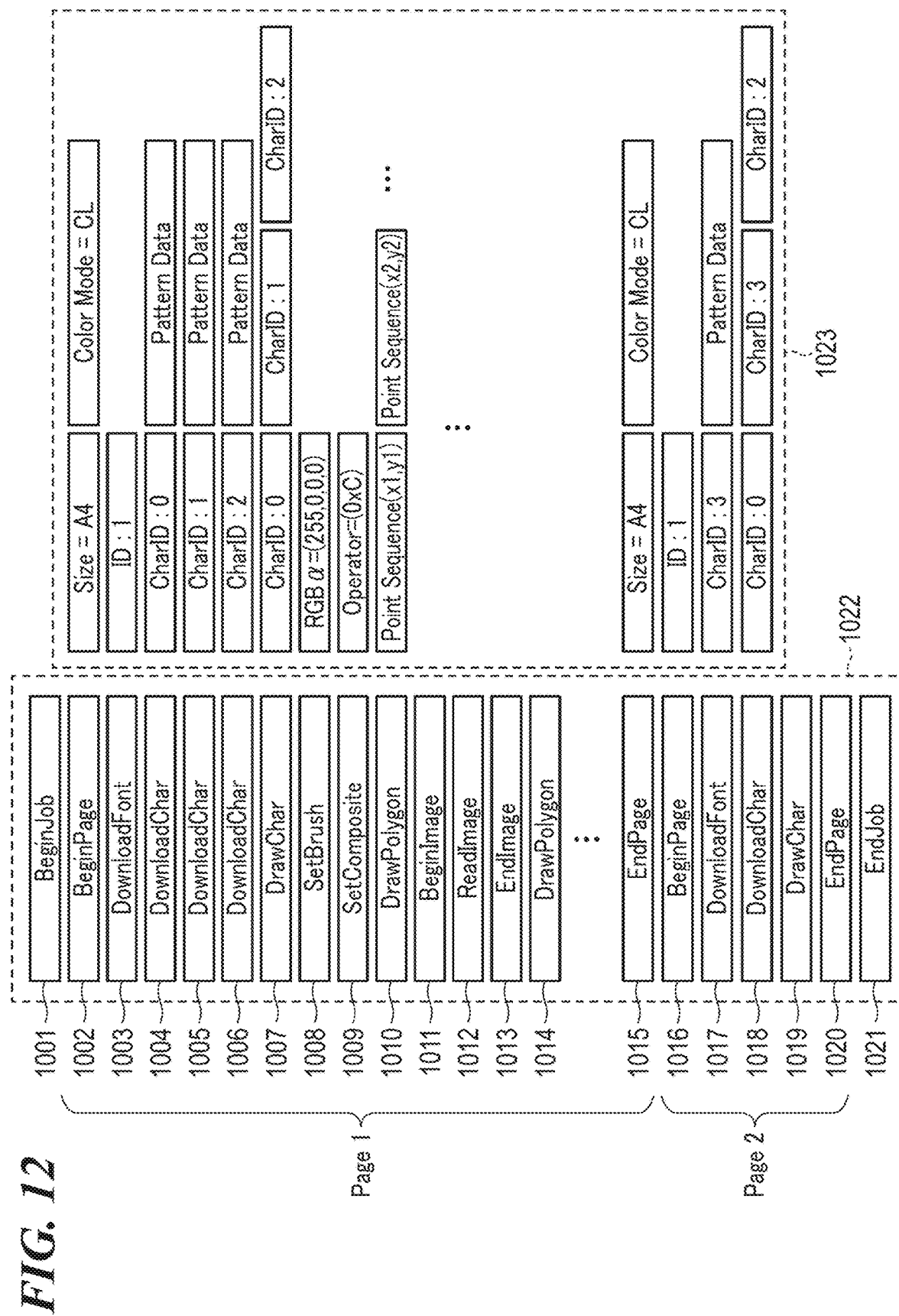
FIG. 12 is a view showing a configuration of PDL data.

FIG. 12 is a view showing a configuration of PDL data.

As shown in FIG. 12, the configuration of PDL data includes a command group 1022 and a parameter group 1023. Commands in the command group 1022 is beforehand defined in accordance with the PDL language specification. A parameter in the parameter group 1023 is added to the command to define instruction contents or shows the details of drawing data. Parameters in the parameter group 1023 are set up in accordance with the PDL language specification. The parameters include indispensable items of commands and optional items that are added if needed because initial values are decided.

The PDL data shown in FIG. 12 forms hierarchical structure of the PDL commands of two pages sandwiched between a BeginJob command 1001 showing a start of the PDL data and an EndJob command 1021 showing an end of the PDL data. That is, this PDL data includes two-page configurations in which BeginPage commands 1002 and 1016 that are page start commands showing starts of page descriptions and EndPage commands 1015 and 1020 that are page end commands showing ends of the page descriptions are respectively paired. Then, these page configurations include command groups used in various drawing processes.

Moreover, the PDL data shown in FIG. 12 includes a command for registering font data as a resource into the storage unit 124 and a command for printing as an example of the command group for the drawing process. Specifically, the PDL data includes a DownloadFont command 1003 and DownloadChar commands 1004 through 1006. Parameters including an ID for designating a font and a font header as common data are added to the DownloadFont command 1003. The DownloadChar commands 1004 through 1006 register font data in units of the character. Each of the DownloadChar commands 1004 through 1006 has parameters including a CharID for identifying the character and pattern data representing a glyph form of the character. Then, the pattern data of the registered character is printed by a DrawChar command 1007 that has the CharID as a parameter. It should be noted that a character object means an object of which the drawing command set includes these commands 1003 through 1007 in the first embodiment. Hereinafter, such a command that registers or deletes the font data for printing a character is referred to as resource control command It should be noted that the resource control command does not include the DrawChar command.

Moreover, the PDL data shown in FIG. 12 includes a command group for printing a graphic and an image as an example of the command group for the drawing process. A SetBrush command 1008 for setting color information and a SetComposite command 1009 for setting composition information with a background define parameters about a color and background composition of the following command. A graphic like a rectangle is printed by a DrawPolygon command 1010 that has point sequence information that is a group of vertex coordinates of a graphic as a parameter. It should be noted that a graphic object means an object of which the drawing command set includes these commands 1008 through 1010 in the first embodiment. Three commands (a BeginImage command 1011, a ReadImage command 1012, and an EndImage command 1013) for drawing an image constitute one set. One sheet of image is expressed by these three commands 1011 through 1013. Moreover, one sheet of image expressed by these three commands 1011 through 1013 is printed by a DrawPolygon command 1014 immediately succeeding the command 1013. It should be noted that an image object means an object of which the drawing command set includes these commands 1011 through 1014 in the first embodiment.

Although various parameters, such as a character size, a print direction, a print color, and a modification designation, are usually designated in PDL data in reality, their descriptions are omitted for simplification.

Figure 4B:
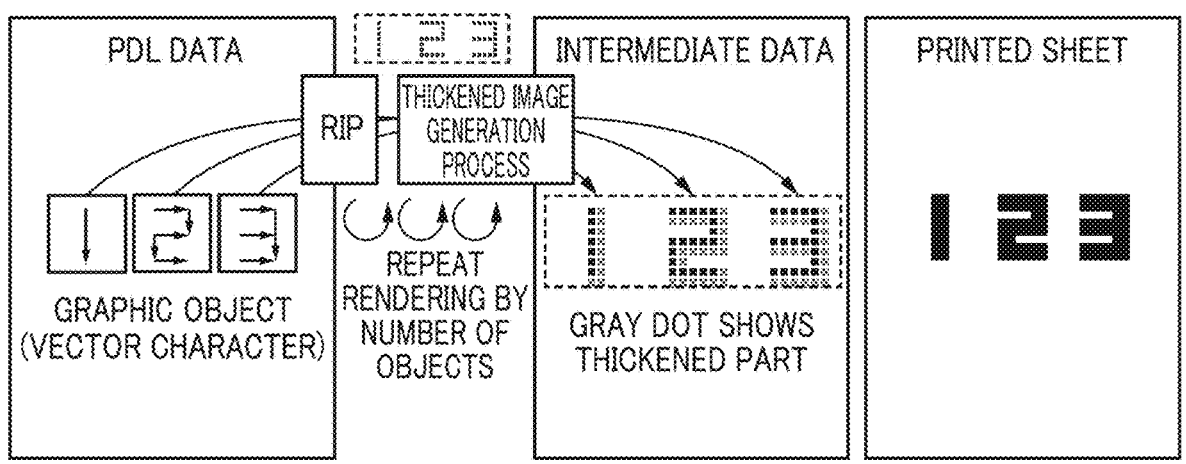
FIG. 4B is a view showing an application stage of the thickening process in FIG. 4A.

Hereinafter, the image forming process in a case where the PDL analysis module 202 generates a graphic object showing a plurality of vector characters (graphics characters) from PDL data of a print target will be described in the first embodiment. In this case, the thickening module 205 repeats the rendering process and the thickened-image generation process by the number of objects as shown in FIG. 4B. After the above-mentioned rendering process and the thickened-image generating process to one object are completed, the intermediate data generation module 203 generates intermediate data (DL) from the object and stores it into the DL memory area of the RAM 122. Then, after the intermediate data generation module 203 finishes generating the DLs corresponding to all the graphic objects generated by the PDL analysis module 202, the RIP module 204 rasterizes all the DLs stored in the DL memory area and generates print data.

FIG. 3 is a flowchart showing procedures of the image forming process according to the first embodiment up to printing of the image data (raster image) rasterized after interpreting the PDL data of the print target is interpreted and thickening the graphic object. In addition, the program for performing this process is developed to the RAM 122 at the start-up of the image forming apparatus 110, and is executed by the CPU 121.

In step S301, the data receiving module 201 reads PDL data that the user selected as the print target in the step S906 from among the PDL data saved in the RAM 122 or storage unit 124 in the step S905.

In step S302, the PDL analysis module 202 and the intermediate data generation module 203 repeat the process in the following steps S303 through S307 up to the end of the received PDL data is read.

Figure 6A:
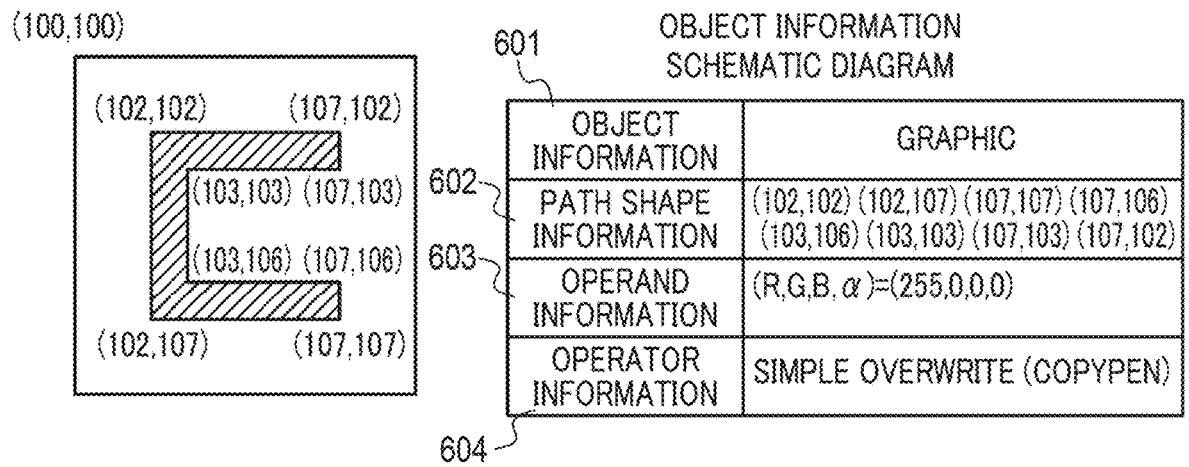
FIG. 6A through FIG. 6D are views for describing an object generation method in step S303 in FIG. 3.

In step S303, the PDL analysis module 202 interprets PDL commands and generates an object in units of the drawing command. FIG. 6A shows a configuration of an object generated in the step S303 in the first embodiment. Object information 601 shows an attribute of an object, such as whether the object is an image object or a graphic object. Path shape information 602 is information about a position and an outline of the object, such as drawing area information about the object, and path point sequence information that expresses an outline of the object by point sequence. Operand information 603 is information about drawing, such as an operand type (an image, a fill, etc.) of the object, a color information, and color space (RGB, Gray, etc.). Operator information 604 relates to hierarchy of the object and composition with a background. This example shows the object that simply overwrites the graphic object having the outline described in the path shape information 602 in monochromatic red to the background. Moreover, when the drawing command set includes a command whose parameter is a matrix, the information about the matrix is also included in the object information 601. However, it is not shown in FIG. 6A.

In step S304, the thickening module 205 determines whether the object generated in the step S303 is a graphic object or an image object on the basis of the attribute of the object defined by the object information 601. As a result of the determination, when it is a graphic object, the process proceeds to step S305. When it is an image object, the process proceeds to step S307. In the first embodiment, since the attribute of the object defined by the object information 601 is graphic as shown in FIG. 6A, the process proceeds to the step S305.

In the step S305, the thickening module 205 determines whether background composition is unnecessary. Specifically, the thickening module 205 determines whether composition of the object with the background needs pixel information about a background image from the operator information about the object generated in the step S303. When the background composition is unnecessary, the process proceeds to step S306. When the background composition is required, the process proceeds to step S307. In the first embodiment, since the operator information 604 shows the object that simply overwrites as shown in FIG. 6A and the background composition is unnecessary, the process proceeds to the step S306. In addition, when the operator information shows a transparent object that needs arithmetic composition with background pixels or an object to which an ROP (a raster operation) is designated that needs logical composition, for example, the background composition is necessary. In the meantime, when the operator information shows objects that do not need background information, such as a black-painted object and a white-painted object, besides the above-mentioned object that simply overwrites, the background composition is unnecessary.

In the step S306, the thickening process shown by a flowchart in FIG. 4A is performed. A program in steps S401 through S404 described in the flowchart in FIG. 4A is developed to the RAM 122 at the start-up of the image forming apparatus 110 and is executed by the CPU 121.

In the step S401, the thickening module 205 extracts a scaling component from a matrix included in the object information 601 about the graphic object and executes a scaling process on the basis of the extracted scaling component. In addition, only the execution of the scaling process is described in the first embodiment for simplification. However, since the thickening process is hardly effective to an object that is greatly expanded or reduced in general, the thickening process may be applied only when the scaling ratio satisfies a threshold. Otherwise, the process may shift to the step S404 without applying the thickening process.

In the step S402, the thickening module 205 renders the object. The details of a rendering process will be described using FIG. 6A through FIG. 6D. In the first embodiment, the process to render the object shown in FIG. 6A will be described.

Figure 6B:
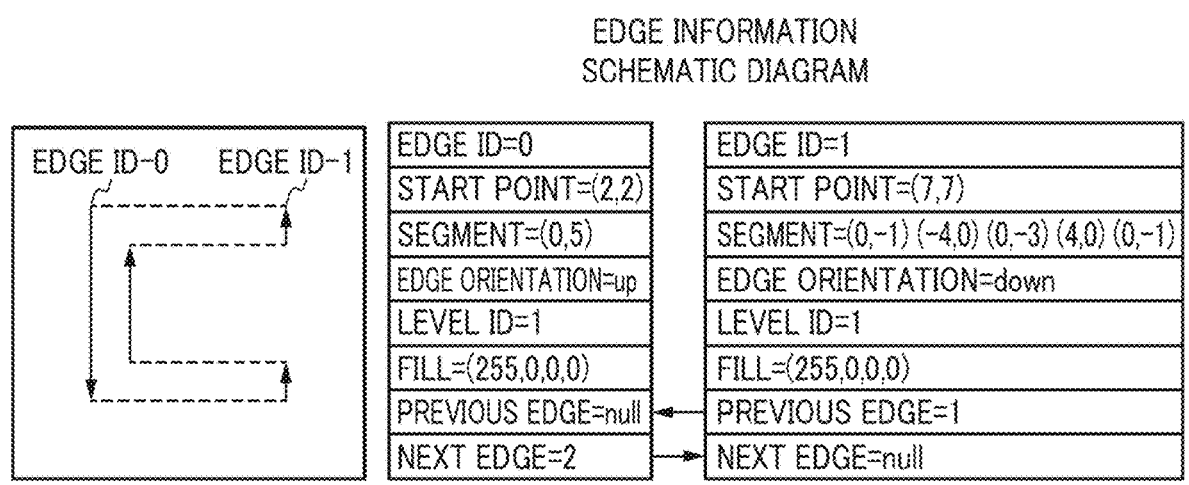

The thickening module 205 extracts an outline from the path shape information 602 (FIG. 6A) about the object and converts it into edge information (FIG. 6B). The edge information is information for specifying each edge. Specifically, the edge information includes an inherent edge ID, a starting point that shows a coordinate of a starting point, a segment that shows transition from the starting point, an edge orientation, and a level ID that shows hierarchical relationship of an area of a closed section defined by the edge. Furthermore, the edge information includes the fill that shows painting information about the closed section defined by the edge and addresses of a previous edge and next edge that will be linked. The edge ID-0 and edge ID-1 make a pair and the color value of the area sandwiched between the edges is decided depending on the fill.

Figure 6C:
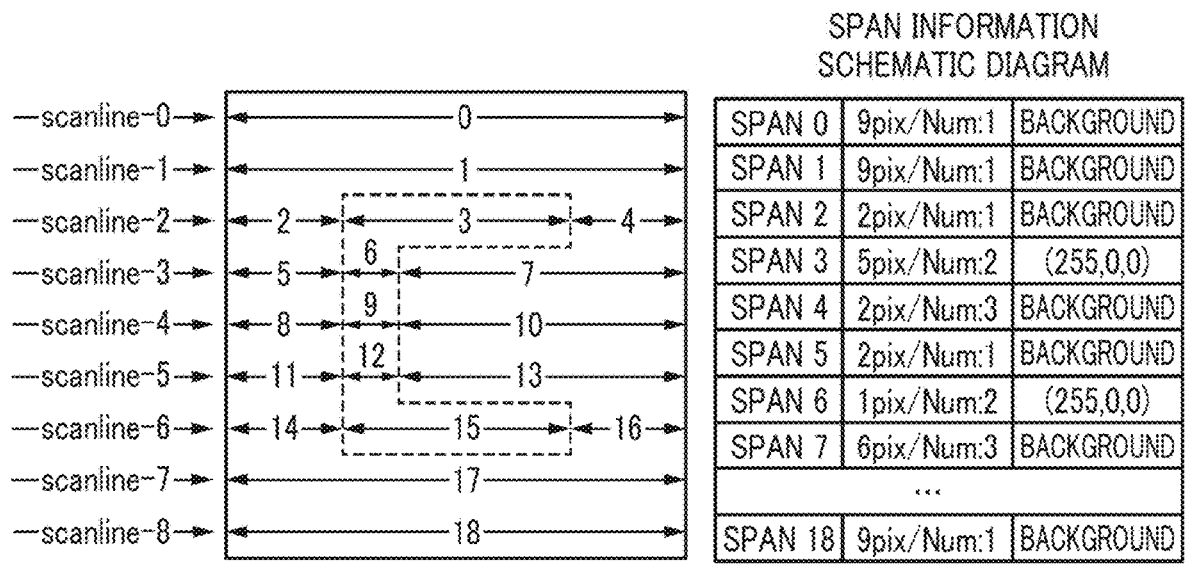

As shown in FIG. 6C, the thickening module 205 scans edges in units of the scan line on the basis of the edge information and divides the drawing area into closed sections called spans that are sectioned with edges and both ends of the drawing area. For example, a scanline-3 is divided into three continuous spans 5 through 7. The span 5 has two pixels from the left end in a color value of the background. The span 6 has one pixel in a color value of (R, G, B, α)=(255, 0, 0, 0). The span 7 has six pixels in the color value of the background.

Figure 6D:
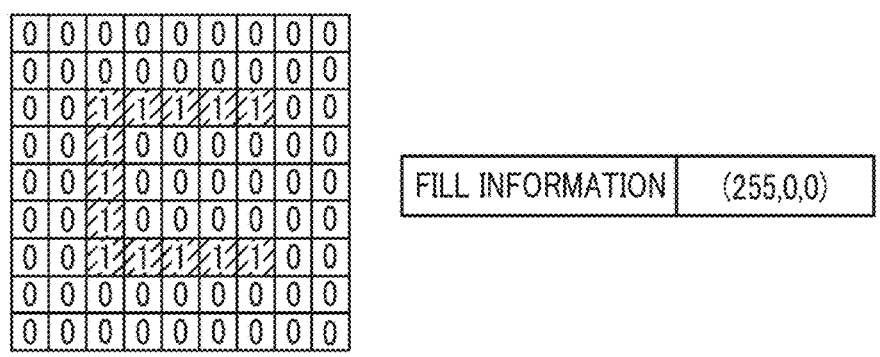

As shown in FIG. 6D, the thickening module 205 generates a mask image in which a colored pixel is represented by "1" and another pixel is represented by "0" on the basis of span information. In the first embodiment, as shown in FIG. 6D, the data that represents that a pixel of "0" is the background and a pixel of "1" is painted by the color value of (R, G, B, α)=(255, 0, 0, 0) is generated.

Figure 5:
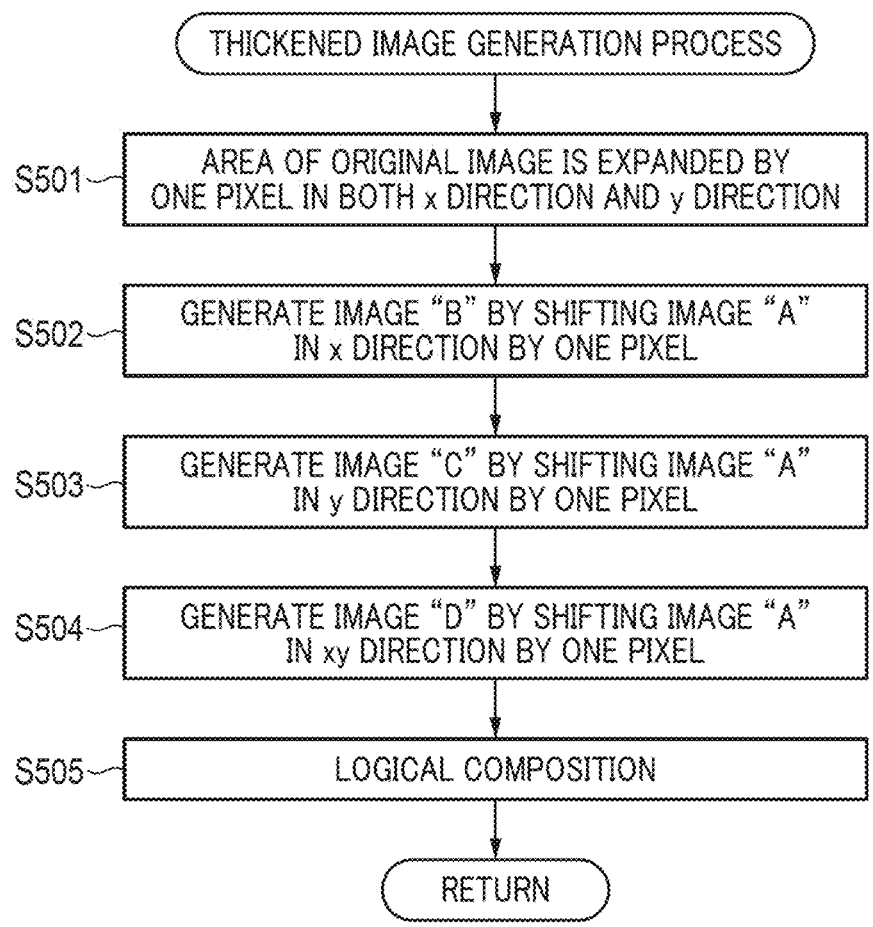
FIG. 5 is a flowchart showing procedures of a thickened image generating process in step S403 in FIG. 4A.

In the step S403, the thickening module 205 performs the thickened image generating process shown by the flowchart in FIG. 5. A program in steps S501 through S505 described in the flowchart in FIG. 5 is developed to the RAM 122 at the start-up of the image forming apparatus 110 and is executed by the CPU 121. Moreover, although an example for thickening an object by one pixel as a thickening width in thickening directions of an x-direction, a y-direction, and an xy-direction (oblique) will be described in this embodiment, the thickening directions and the thickening width are not limited. For example, when the thickened image generating process in FIG. 5 with respect to one object is finished, preview images before and after applying the thickening process to the object (for example, preview images of an image A and a final image 750 mentioned later) may be displayed on the display panel 1101. Thereby, the user is able to check whether the object has been thickened to desired thickness. Moreover, it may be configured so that the thickening direction and thickening width can be changeable according to a user's designation through the operation unit 131 when the object has not been thickened to the desired thickness. In this case, the thickened image generating process in FIG. 5 is executed again according to the thickening direction and thickening width that have been changed. Moreover, the thickening direction and the number of pixels as the thickening width may be changed for each graphic object included in the PDL data according to the user's designation through the operation unit 131. Hereinafter, each step of the thickened image generating process in FIG. 5 will be described by referring to FIG. 7A through FIG. 7E.

In the step S501, the thickening module 205 performs a process that expands the area of the mask image (original image) generated in the step S402 by one pixel in both of the x direction and y direction. This process is performed to change the width and height of the original image beforehand because a logical composite image generated in the step S505 mentioned later will exceed the width and height of the original image by the number of shifted pixels. FIG. 7A shows an image "A" generated in the step S501.

In the step S502, the thickening module 205 generates an image "B" by shifting the image "A" generated in the step S501 in the x direction as the thickening direction by one pixel as the thickening width. FIG. 7B shows the image "B" generated in the step S502.

In the step S503, the thickening module 205 generates an image "C" by shifting the image "A" generated in the step S501 in the y direction as the thickening direction by one pixel as the thickening width. FIG. 7C shows the image "C" generated in the step S503.

Figures 7D, 7E:
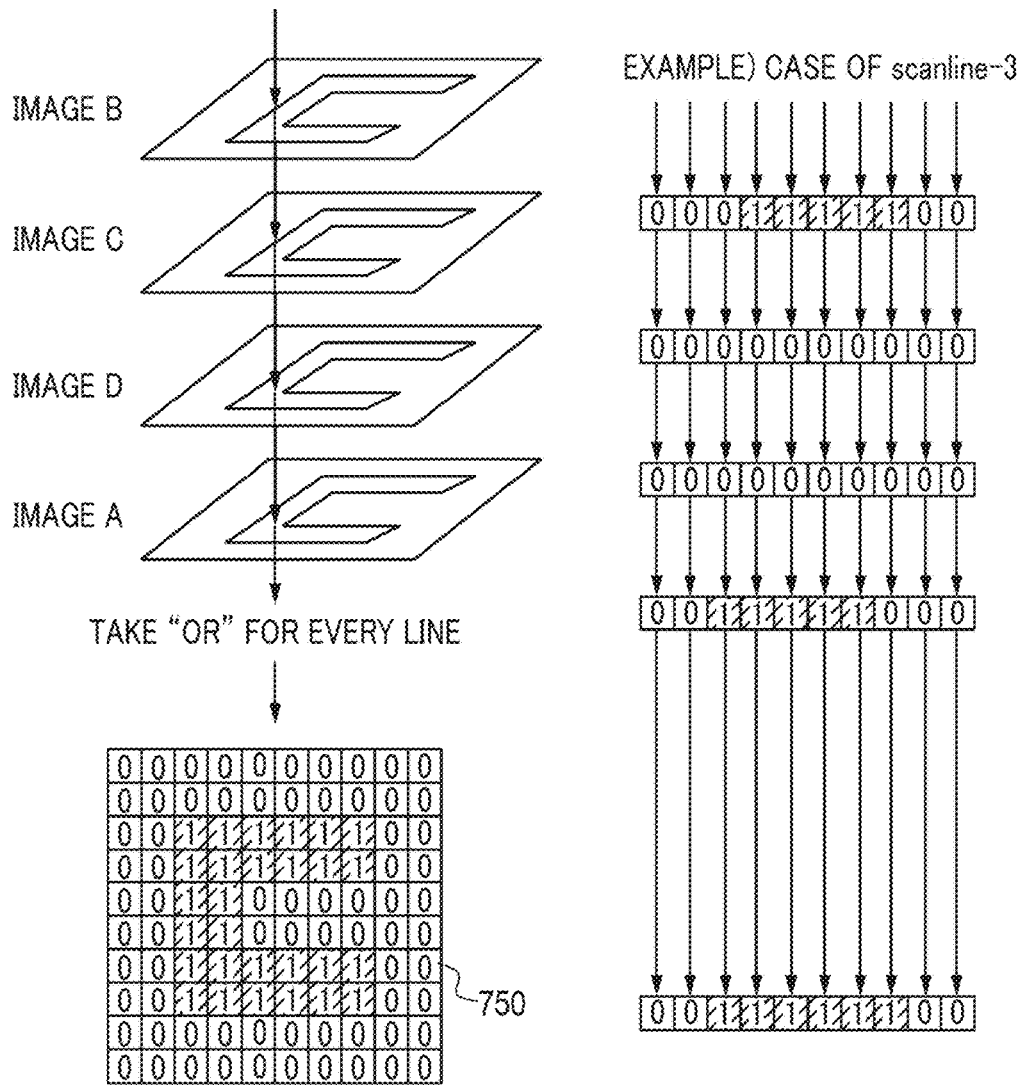

In the step S504, the thickening module 205 generates an image "D" by shifting the image "A" generated in the step S501 in the xy direction as the thickening direction by one pixel as the thickening width. FIG. 7D shows the image "D" generated in the step S504.

In the step S505, the thickening module 205 generates a final image 750 by logically composing the images "A", "B", "C", and "D" generated in the steps S501, S502, S503, and S504 in piles. And then, the thickening module 205 finishes this process and shifts the process to the step S404 in FIG. 4A. FIG. 7E is a view showing a state where the final image 750 is generated by taking a logical sum (OR) in units of the scan line. As shown in FIG. 7E, if one of four pixels at the same position on the images "A", "B", "C", and "D" has the value "1", the value of the corresponding pixel on the mask image to be output becomes "1". The mask image as the final image 750 shown in FIG. 7E is generated by repeating the logical sum calculation for all the scan lines. Although the case where the mask images generated in the steps S501 through S504 are logically composed together is described in this embodiment, the mask images may be logically composed in each step whenever a mask image is generated to save a memory space. In that case, the process is executable with a memory space that is twice of the memory space used in the step S501 at the maximum.

When the parameters of the drawing command set define at least one of a rotation process, moving process, and shearing process, the thickening module 205 applies the defined process in the step S404 to the mask image generated by the thickening process in the step S403, and then finishes this process. After that, the process proceeds to the step S307 in FIG. 3. Since the thickening process is performed in the step S403 before the step S404 in which the rotation process etc. is performed as mentioned above, the thickening module 205 never loses the thickening direction even if the rotation process etc. is applied to the object. Namely, the thickening process in the uniform direction is applicable to the font data that consists of the graphic objects.

In the step S307, the intermediate data generation module 203 converts the objects into the DL that is the intermediate data format that the RIP 141 can interpret. In addition, since the DL has a list structure, the objects are added to the DL in units of the object.

In step S308, the RIP module 204 performs an RIP (Raster Image Process) that generates a raster image by rasterizing the page on the basis of the DL generated by the process up to the step S307. Moreover, the RIP module 204 transfers the generated raster image to the print image processing unit 142 via the image bus 170. The print image processing unit 142 generates a screen image that is interpretable by the printer engine 151 by performing various image processes and the screening process.

In step S309, the printer engine 151 performs the printing process by transferring the screen image generated in the step S308 onto a paper medium conveyed.

Since the thickening process is performed in units of the object in the first embodiment, the thickening process is applicable to a front object without receiving an interference on the background even if the object has the same attribute as the background. This is an advantage over a case where the thickening process is applied to a post-rasterization image in units of the attribute. Moreover, since the thickening process is performed only by the logical composition of binary images in units of the object, the thickening process is performed at higher speed than the conventional technique that determines a graphics character by scanning density difference between adjacent pixels.

The first embodiment describes the thickening process in the configuration where the saved print job is selected from the job list and is printed. Specifically, the configuration where the thickening process is performed in units of the job in response to the press of the print setting button 1132 (FIG. 13) at the time of selection of a print job is described. However, the first embodiment is applicable to a printing system in which the image forming apparatus 110 does not save a print job (there is no job list). In such a case, since the setting value of the thickness adjustment is set from a main-body setting of the image forming apparatus 110 that has been preset before inputting a print job, the thickness adjustment depending on the same setting continues until the setting value of the thickness adjustment of the main-body setting is changed again.

Next, the second embodiment of the present invention will be described. Although the thickening process is executed for each generated object in the first embodiment, a configuration in which objects that satisfy specific conditions are collectively subjected to the thickening process to accelerate the process will be described in the second embodiment. Specifically, objects that satisfy specific conditions are continuous objects of which drawing areas do not overlap and that are in the same color (fills are identical) in the second embodiment.

Figure 8A:
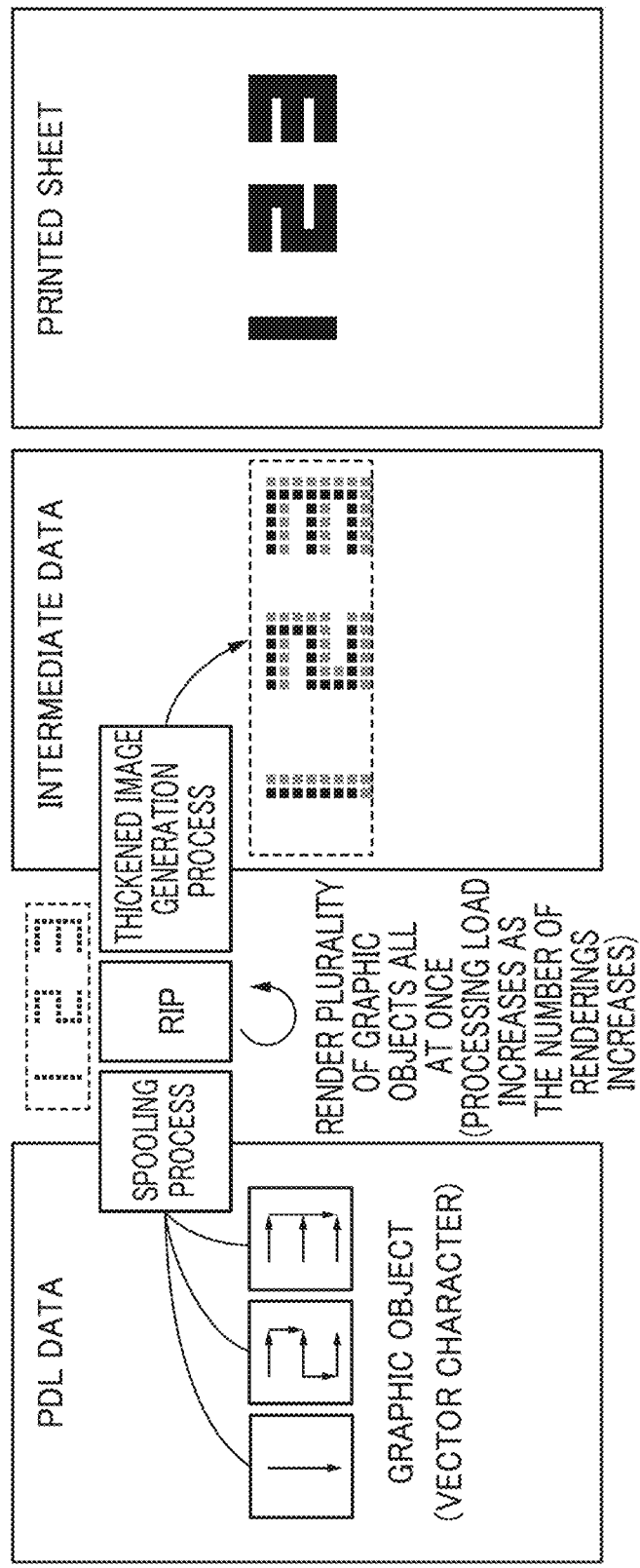
FIG. 8A through FIG. 8C are views for describing a thickening process according to a second embodiment.

Hereinafter, the image forming process in a case where the PDL analysis module 202 generates a plurality of graphic objects from PDL data of a print target will be described in the second embodiment. When all graphic objects generated by the PDL analysis module 202 represent vector characters as shown in FIG. 8A, these objects are spooled and the thickening process is applied to the spooled objects all together. Thereby, the number of times of the thickening process, especially the rendering process, executed in the image forming process becomes smaller than that in the first embodiment, which reduces the processing load.

Figure 8B:
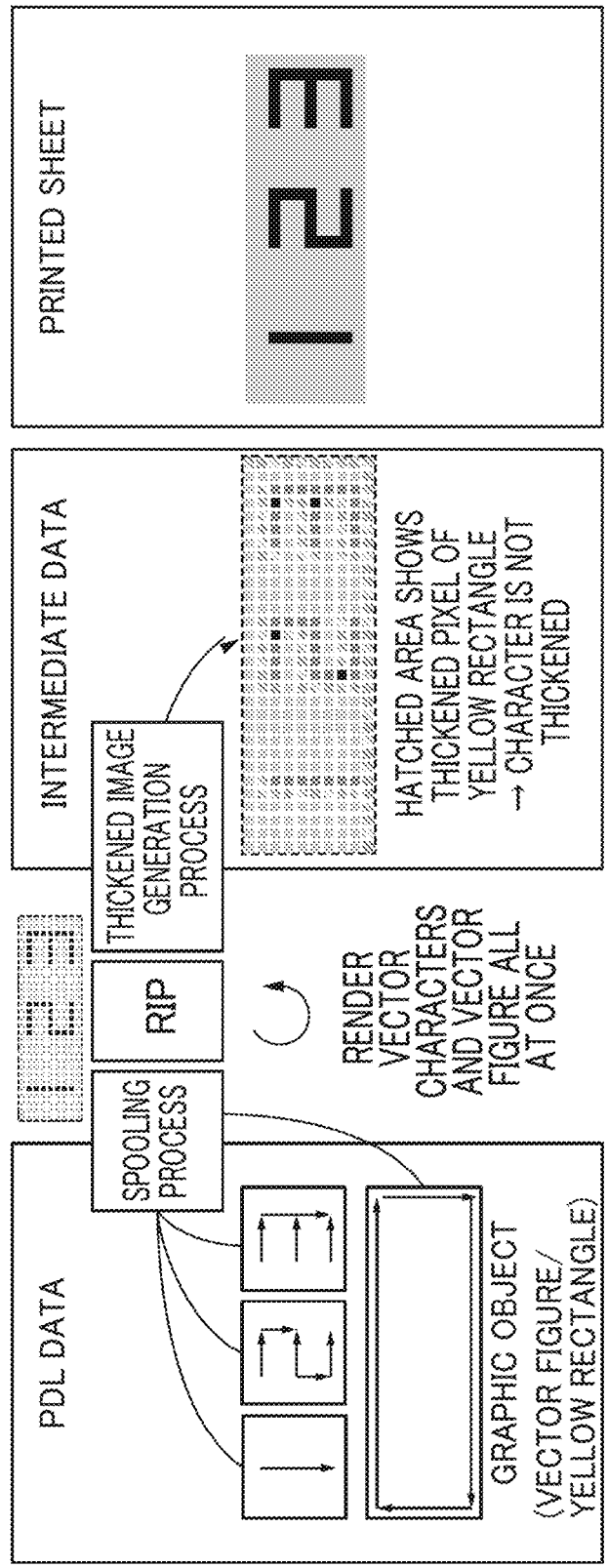
Figure 8C:
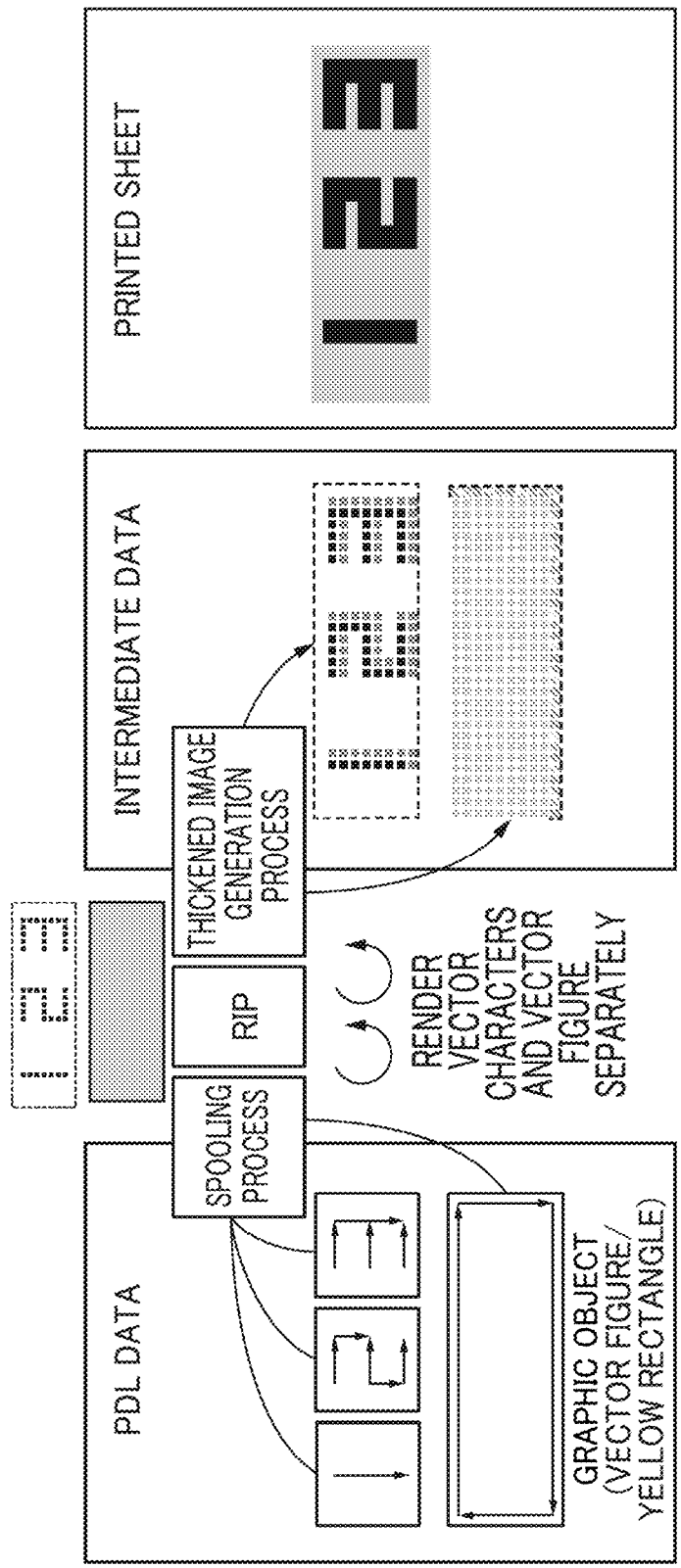

However, there is a case where graphic objects generated by the PDL analysis module 202 include an object that represents a vector figure besides objects that represent vector characters. In such a case, if the thickening module 205 executes the rendering process and thickening process to the generated graphic objects all together as shown in FIG. 8B, the problem that the characters are not thickened will occur. Accordingly, the thickening module 205 executes the rendering processing and thickening process to a vector character and these processes to a vector figure separately as shown in FIG. 8C in the second embodiment.

Hereinafter, the configuration and step that are the same as that in the first embodiment are indicated by the same reference numerals and the duplicate descriptions are omitted.

Figure 9:
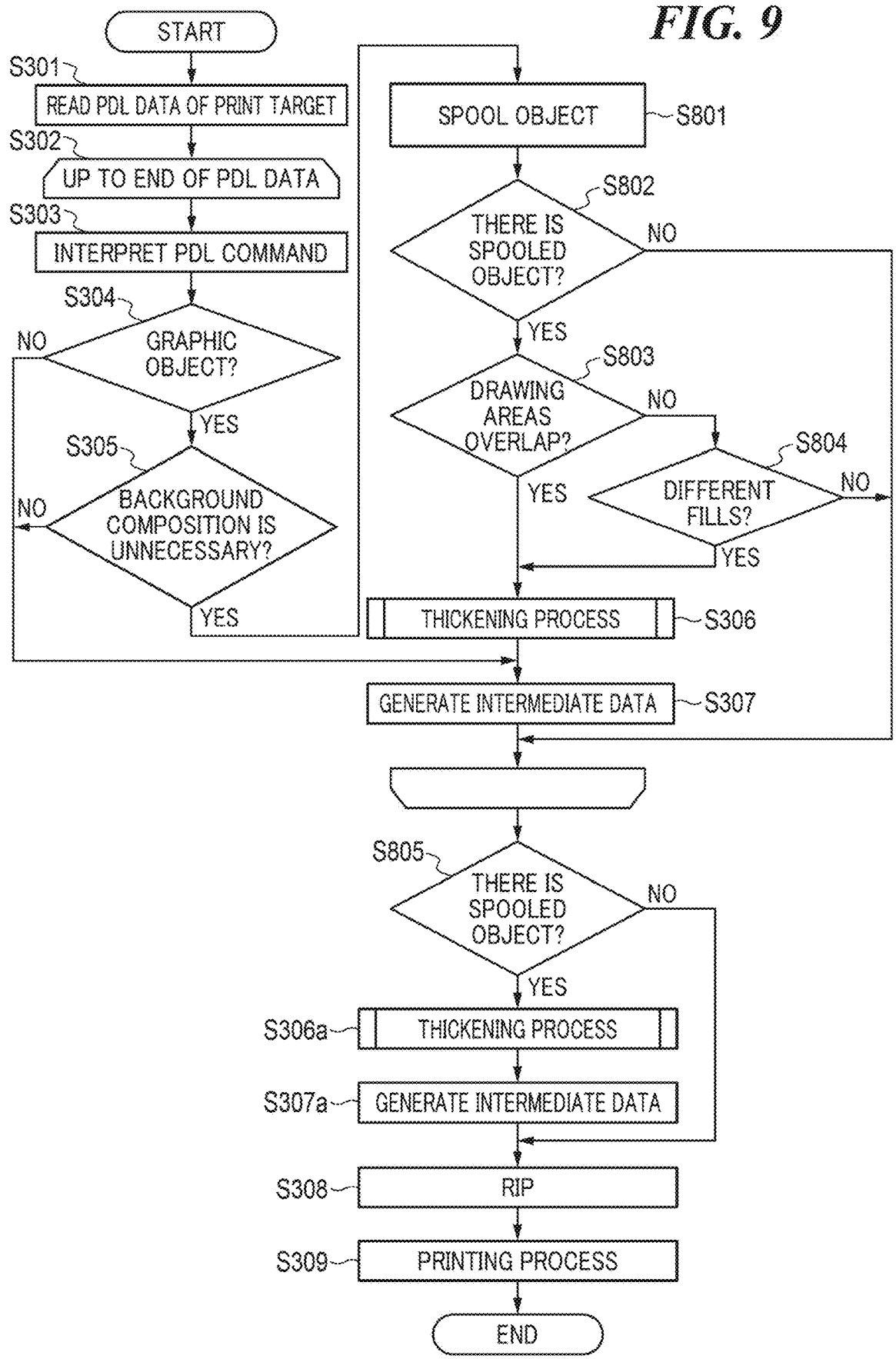
FIG. 9 is a flowchart showing procedures of an image forming process according to the second embodiment.

FIG. 9 is a flowchart showing procedures of the image forming process according to the second embodiment up to printing of the image data (raster image) that is rasterized after interpreting the received PDL data and thickening the graphic object. In addition, the program for performing this process is developed to the RAM 122 at the start-up of the image forming apparatus 110, and is executed by the CPU 121. Hereinafter, difference from the process in FIG. 3 will be described while omitting the description about the steps S301 through S309.

After the process in the steps S301 through S305, the thickening module 205 proceeds with the process to step S801 and spools the object to the RAM 122.

In step S802, the thickening module 205 determines whether there is an object that has been spooled before spooling the object in the step S801. When there is an object that has been already spooled (i.e., when the spool area of the RAM 122 is in a state like FIG. 10A), the process proceeds to step S803. Otherwise, the process returns to the step S303 and the following PDL command is interpreted.

In the step S803, the thickening module 205 determines whether the drawing area of the object spooled in the step S801 overlaps with the drawing area of the object spooled beforehand. For example, when the object spooled in the step S801 is a vector figure and when the vector figure overlaps with objects representing vector characters that have been already spooled as shown in FIG. 10B, the thickening module 205 determines that the drawing areas overlap. As a result of the determination, when the drawing areas overlap, the thickening module 205 executes the thickening process in the step S306 to only the object that has been already spooled. The object spooled in the step S801 is continuously spooled as-is. Then, the process proceeds to the step S307. This is because the object spooled in the step S801 may be combined with an object that will be spooled at the next time. In the meantime, when the drawing areas do not overlap (NO in the step S803), the process shifts to step S804.

In the step S804, the thickening module 205 determines whether the fill (painting inside an outline) of the object spooled in the step S801 is different from the fill of the object that has been already spooled using the operand information 603. When the fills are different, the thickening module 205 executes the thickening process in the step S306 to only the object that has been already spooled. The object spooled in the step S801 is continuously spooled without executing the thickening process. Then, the process proceeds to the step S307. This aims to avoid the following defect. That is, if the thickening process is executed after combining different fills, it becomes necessary to determine which fill is applied to the color in the painted area that is added by shifting (i.e., the thickened area) at the time of the logical composition in the step S505, which deteriorates the performance. When the fills are identical, it is determined that the object spooled in the step S801 is combinable with the object that has been already spooled, and the process proceeds to the step S307 while continuing the spooled state of both the objects as combination waiting objects.

In the step S307, the intermediate data generation module 203 generates the intermediate data only from the objects to which the thickening process has been executed. After this process, all the objects that continue the spooled state without being subjected to the thickening process are held in the spool area as the combination waiting objects as shown in FIG. 10C and FIG. 10D. After that, the following PDL command is interpreted (the step S303).

Even after finishing reading the end of the PDL data, one or more combination waiting objects may remain in the spool area as shown in FIG. 10D. Accordingly, the thickening module 205 determines whether there is any spooled object in step S805. When there is any spooled object, the thickening module 205 executes the thickening process in FIG. 4A to the spooled objects all together. After that, the intermediate data generation module 203 converts each object to which the thickening process in the step S306a has been applied into the DL in step S307a. In the meantime, when there is no spooled object, the RIP is executed on the basis of the DL generated by then in the step S308.

According to the second embodiment, the thickening process is executed to the objects that are determined to be combinable all together. This decreases the number of execution times of the thickening process (especially the rendering process), which accelerates the entire image forming process.

Next, a third embodiment of the present invention will be described. In the first and second embodiments, the image forming process in the case where the PDL analysis module 202 generates a plurality of graphic objects from PDL data of a print target has been described. On the other hand, the third embodiment describes the image forming process in a case where the thickening process is executed even to character objects in addition to the graphic objects generated by the PDL analysis module 202 from the PDL data of the print target. This process is executed when the user selects not only the ON button 1222 for the graphic thickness adjustment but also the ON button 1212 for the character thickness adjustment in the thickness adjustment screen in FIG. 14.

In the third embodiment, although graphic objects that satisfy specific conditions are spooled and the thickening process is applied to the spooled objects all together as with the second embodiment, the thickening process is executed to a character object individually without spooling. This is because the rendering process that increases process load is not executed in the thickening process for a character object.

Hereinafter, the configuration and step that are the same as that in the second embodiment are indicated by the same reference numerals and the duplicate descriptions are omitted.

Figure 15:
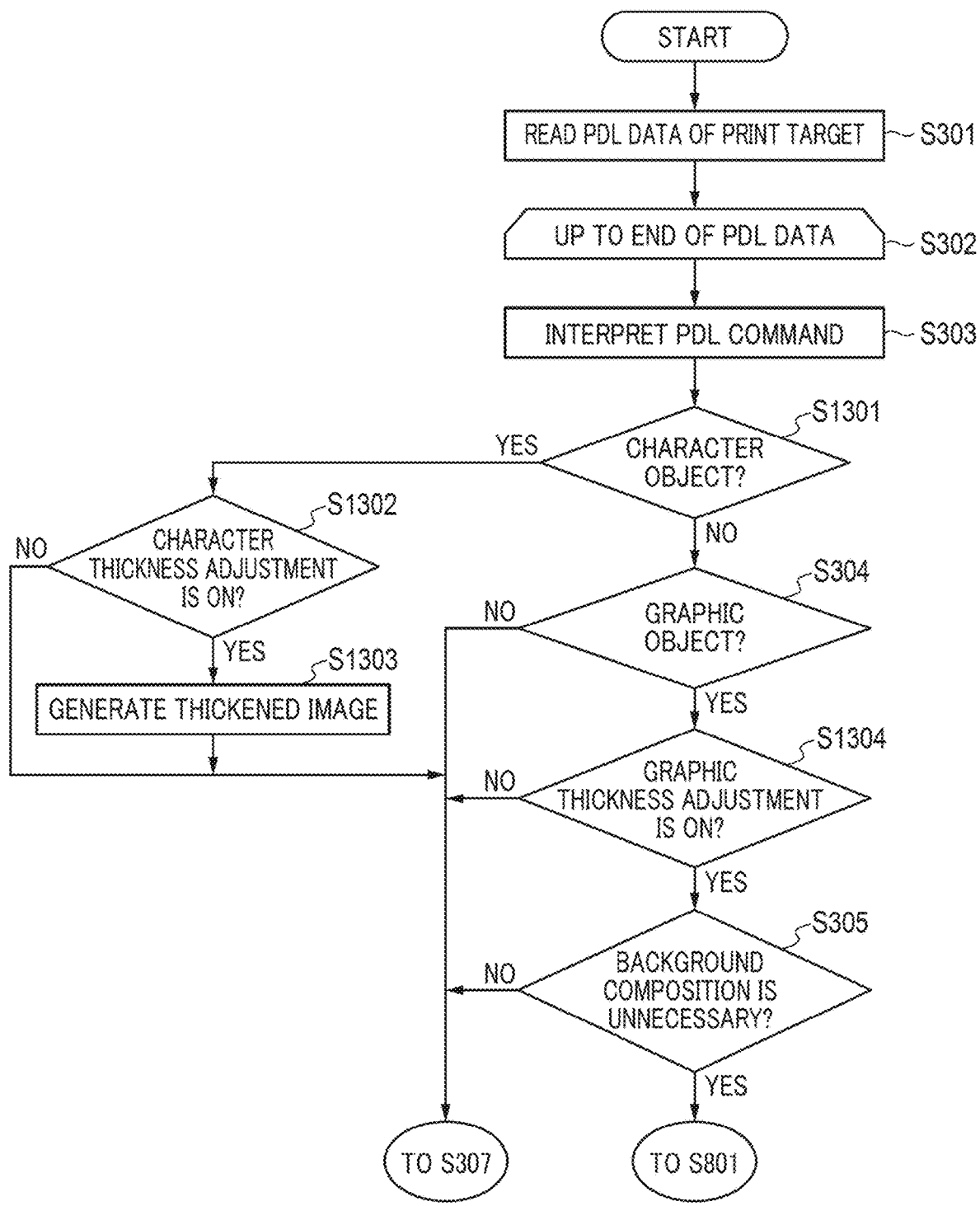
FIG. 15 is a flowchart showing procedures of an image forming process according to a third embodiment.

FIG. 15 is a flowchart showing a part of procedures of the image forming process according to the third embodiment up to printing of the image data (raster image) after interpreting the received PDL data and thickening an object desired by a user. When the determination in the step S305 is YES, the process in and after the step S801 in FIG. 9 will be executed. In the meantime, when the process in the step S1303 has been performed or when the determination in one of the steps S1302, S304, S1304, and S305 is NO, the process in and after the step S307 in FIG. 9 will be executed. In addition, the program for performing this process is developed to the RAM 122 at the start-up of the image forming apparatus 110, and is executed by the CPU 121. Hereinafter, difference from the process in FIG. 9 will be described while omitting the description about the steps S301 through S309 and steps S801 through S804.

After the process in the steps S301 through S304, the thickening module 205 proceeds with the process to step S1301 and determines the attribute of the object generated in the step S303 from the object information 601. As a result of this determination, when the object is a character object, the process proceeds to the step S1302. Otherwise, the process proceeds to the step S304.

It is determined whether the user selects the ON button 1212 for the character thickness adjustment in the thickness adjustment screen in FIG. 14 in the step S1302. As a result of this determination, when the user selects the ON button 1212, the process proceeds to step S1303. When the user does not select the ON button 1212, the process proceeds to the step S307.

In the step S1303, a thickened image is generated by thickening a glyph form of a character directly to the thickening width designated by the user without executing the rendering process that is executed in the thickening process (FIG. 4A) for a graphic object. After that, the process proceeds to the step S307.

In the meantime, when the attribute of the object determined as mentioned above means a graphic object in the step S304, the process proceeds to step S1304. Otherwise, the process proceeds to the step S307.

In the step S1304, it is determined whether the user selects the ON button 1222 for the graphic thickness adjustment in the thickness adjustment screen in FIG. 14. As a result of this determination, when the user selects the ON button 1222, the process proceeds to the step S305. When the user does not select the ON button 1222, the process proceeds to the step S307.

According to the third embodiment, character objects among the characters included in the received PDL are individually subjected to the thickening process to generate thickened images without executing the rendering process. About graphic characters, objects that are determined to be combinable are subjected to the thickening process all together. Accordingly, a thickened image of the character included in the received PDL data is generated by the optimal method corresponding to the attribute of the object.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-117096, filed Jun. 20, 2018, which is hereby incorporated by reference herein in its entirety.

What is claimed is:

1. An image forming apparatus comprising:
at least one controller, having one or more processors that execute instructions stored in at least one memory and/or one or more circuitries, being configured to:
generate a graphic object from a drawing command set for printing the graphic object included in a print job;
generate a first mask image by rendering the graphic object;
generate a second mask image by shifting the first mask image in a thickening direction by the number of pixels of a thickening width;
generate a third mask image by logically composing the first mask image and the second mask image;
convert the third mask image into intermediate data; and
generate a raster image by rendering of the intermediate data.

2. The image forming apparatus according to claim 1, wherein the second mask image consists of a plurality of mask images of which the thickening directions are different.

3. The image forming apparatus according to claim 1, wherein the at least one controller is configured to convert the graphic object into the intermediate data without generating the first mask image and the second mask image in a case where the drawing command set does not include a command showing that background composition is needed.

4. The image forming apparatus according to claim 1, wherein the at least one controller is configured to execute a scaling process based on a matrix before executing the rendering process in a case where the drawing command set includes the matrix as a parameter.

5. The image forming apparatus according to claim 1, wherein the at least one controller is configured to execute at least one of a rotation process, a moving process, and a shearing process after generating the third mask image in a case where the drawing command set includes at least one of the rotation process, the moving process, and the shearing process as a parameter.

6. The image forming apparatus according to claim 1, wherein the at least one controller is configured to generate the first mask image by rendering objects that satisfy specific conditions among a plurality of graphic objects all together in a case where the print job includes a drawing command set for printing a plurality of graphic objects.

7. The image forming apparatus according to claim 6, wherein a plurality of objects of which drawing areas do not overlap and of which fills are identical satisfy the specific conditions.

8. The image forming apparatus according to claim 1, wherein the at least one controller is configured to:
display preview images of the first mask image and the third mask image in a case where the raster image based on the graphic object is generated; and
change the thickening direction and the thickening width to the graphic object according to a user's instruction.

9. The image forming apparatus according to claim 1, wherein the at least one controller is configured to:
generate a character object from the drawing command set included in the print job;
generate a thickened image by thickening a glyph form of the character object by the thickening width; and
convert the thickened image into the intermediate data.

10. The image forming apparatus according to claim 9, wherein the first, second, and third mask images are generated in a case where a user gives a first instruction to adjust the thickness of the graphic object, and the intermediate data is generated in a case where the user gives a second instruction to adjust thickness of the character object.

11. The image forming apparatus according to claim 10, wherein a preview image of the third mask image is displayed in the case where the second instruction is given.

12. A control method for an image processing apparatus, the control method comprising:
generate a graphic object from a drawing command set for printing the graphic object included in a print job;
generate a first mask image by rendering the graphic object;
generate a second mask image by shifting the first mask image in a thickening direction by the number of pixels of a thickening width;
generate a third mask image by logically composing the first mask image and the second mask image;
convert the third mask image into intermediate data; and
generate a raster image by rendering of the intermediate data.

13. A non-transitory computer-readable storage medium storing a control program causing a computer to execute a control method for an image forming apparatus, the control method comprising:
generate a graphic object from a drawing command set for printing the graphic object included in a print job;
generate a first mask image by rendering the graphic object;
generate a second mask image by shifting the first mask image in a thickening direction by the number of pixels of a thickening width;
generate a third mask image by logically composing the first mask image and the second mask image;
convert the third mask image into intermediate data; and
generate a raster image by rendering of the intermediate data.

* * * * *